(12) United States Patent
Veit et al.

(10) Patent No.: US 7,696,809 B2
(45) Date of Patent: Apr. 13, 2010

(54) HIGH CURRENT POWER OUTPUT STAGE

(75) Inventors: Claudius Veit, Pfungstadt (DE); Werner Weiss, Usingen (DE)

(73) Assignee: VDO Automotive AG, Regensburg (DE)

( * ) Notice: Subject to any disclaimer, the term of this patent is extended or adjusted under 35 U.S.C. 154(b) by 0 days.

(21) Appl. No.: 11/992,793

(22) PCT Filed: Sep. 21, 2006

(86) PCT No.: PCT/EP2006/066590
§ 371 (c)(1),
(2), (4) Date: May 12, 2008

(87) PCT Pub. No.: WO2007/036482
PCT Pub. Date: Apr. 5, 2007

(65) Prior Publication Data
US 2009/0108909 A1    Apr. 30, 2009

(30) Foreign Application Priority Data
Sep. 29, 2005  (DE) ................. 10 2005 046 682

(51) Int. Cl.
*H03K 17/56* (2006.01)
(52) U.S. Cl. ............ 327/423; 327/424; 327/588; 318/139; 318/430
(58) Field of Classification Search ............ 327/423, 327/424, 588; 318/139, 430
See application file for complete search history.

(56) References Cited

U.S. PATENT DOCUMENTS

| | | | |
|---|---|---|---|
| 5,451,848 A | | 9/1995 | Okada et al. |
| 5,828,192 A | * | 10/1998 | Kawaguchi et al. ........ 318/139 |
| 6,747,432 B2 | * | 6/2004 | Yoshimura ................. 318/599 |
| 6,836,085 B2 | * | 12/2004 | Kawada et al. ............. 318/139 |
| 6,873,511 B2 | | 3/2005 | Spitz |
| 7,049,778 B2 | * | 5/2006 | Katanaya ................ 318/400.04 |

(Continued)

FOREIGN PATENT DOCUMENTS

DE    195 01 985    7/1996

(Continued)

OTHER PUBLICATIONS

German Office Action dated Apr. 6, 2006 issued in corresponding application No. 10 2005 046 682.6.

*Primary Examiner*—Kenneth B. Wells
(74) *Attorney, Agent, or Firm*—Cohen Pontani Lieberman & Pavane LLP

(57) ABSTRACT

A high current end power stage comprises at least four power transistors, two electrical supply lines and a safety fuse. The at least four power transistors have each a diode which is blocked during normal operation of the respective power transistor. The two electrical supply lines couple the at least four power transistors with a supply potential and a reference potential such that two of the at least four power transistors are connected electrically between the supply potential and the reference potential. The safety fuse is connected in series to the at least four power transistors in at least one of the two electrical supply lines. The at least one safety fuse can be triggered by a current which flows through the diode of the at least four power transistors, said diode being then arranged in the direction of conduction, when the supply potential and reference potential are exchanged.

2 Claims, 2 Drawing Sheets

U.S. PATENT DOCUMENTS 7,109,605 B2 * 9/2006 Habu .................. 307/39

FOREIGN PATENT DOCUMENTS

| DE | 100 05 183 | 8/2001 |
| DE | 102 08 981 | 9/2002 |
| JP | 1291628 | 11/1989 |
| JP | 2005065396 | 3/2005 |
| WO | WO 03/077322 | 9/2003 |

* cited by examiner

HIGH CURRENT POWER OUTPUT STAGE

CROSS REFERENCE TO RELATED APPLICATIONS

This is a U.S. national stage of application No. PCT/EP2006/066590, filed on 21 Sep. 2006. Priority is claimed on the following German Application No. 10 2005 046 682.6, filed 29 Sep. 2005 the content of which is incorporated here by reference.

BACKGROUND OF THE INVENTION

1. Field of the Invention

The invention relates to a high current power output stage comprising power transistors, in particular MOSFET power transistors.

2. Description of the Prior Art

High current power output stages are used, for example, in control units of motor vehicles for driving electric motors, e.g., for an electric power steering device or an electric brake force amplifier device. The high current power output stage is operated in a normal operation mode, e.g., with currents of the order of magnitude of 100 amperes. The electrical energy required is provided by a generator device or a battery. When the battery is replaced, the battery can inadvertently be coupled to the high current power output stage with the polarity reversed. The current flow caused as a result of this in the high current power output stage can damage or destroy the power output stage.

DE 102 08 981 A1 discloses a motor vehicle comprising two vehicle electrical systems. A current distributor with power management is provided for each of the two vehicle electrical systems. One of the current distributors comprises an output stage and a microcomputer. The output stage comprises a measuring resistor. The current flow in the output stage is determined from a voltage drop across the measuring resistor by the microcomputer. The current flow in the output stage can be interrupted by corresponding driving of the output stage by the microcomputer. A fusible link is connected in one supply line of the output stage in order to prevent a fire in the event of a short circuit and simultaneous breakdown at the output stage. A relay is provided as a polarity-reversal protection, said relay interrupting the current flow in the event of polarity reversal.

DE 195 01 985 A1 discloses a polarity-reversal protection for a DC-voltage-supplied electronic circuit against damage as a result of polarity reversal. A suppressor diode is connected in parallel with a battery and with electrical loads. A fusible link is connected in a supply line between the battery and the suppressor diode and the electrical loads. In the event of polarity reversal, the suppressor diode is turned on and the fusible link triggers as a result of the current flow caused thereby.

SUMMARY OF THE INVENTION

An object of the present invention is to provide a high current power output stage which is protected against polarity reversal and which is simple and inexpensive.

The invention is distinguished by a high current power output stage comprising at least four power transistors, two electrical supply lines, and at least one fusible link. The at least four power transistors each have a diode which is turned off during normal operation of the respective power transistor. The two electrical supply lines couple the at least four power transistors to a supply potential and a reference potential in such a way that in each case two of the at least four power transistors are connected in series with one another. In particular, the two of the at least four power transistors are in each case, connected electrically in series between the supply potential and the reference potential. The at least one fusible link is electrically connected in series with the at least four power transistors in at least one of the two electrical supply lines. The at least one fusible link can be triggered by a current which, when the supply potential and the reference potential are interchanged, flows through the diode—which is then disposed respectively in the forward direction—of the at least four power transistors.

The invention is based on the insight that power transistors, in particular MOSFET power transistors, each have the diode. The latter is turned off during normal operation of the high current power output stage, that is to say during operation without polarity reversal. In the event of polarity reversal as a result of the supply potential and the reference potential being interchanged, however, the diode is in the on state. As a result, in the event of polarity reversal, a current flows through the diodes of the power transistors and through the fusible link. Said current is so high that the fusible link is triggered by it. The two electrical supply lines are dimensioned for carrying the current for a carrying time duration that is longer than a triggering time duration of the fusible link.

By virtue of the fact that at least four power transistors are provided, through the diodes of which the current flows in the event of polarity reversal, the resulting power loss is distributed between the at least four power transistors. The requirements made of the current-carrying capacity of the power transistors decrease as a result. This has the advantage that inexpensive power transistors can be used. Furthermore, the protection of the high current power output stage against polarity reversal by the fusible link is simple and inexpensive. There is no need to provide any further components for the polarity-reversal protection. In particular, the requirement of a relay for interrupting the current flow in the event of polarity reversal is obviated. The high current power output stage is formed, e.g., as an H bridge with four power transistors or correspondingly has six power transistors for providing three-phase current. However, the high current power output stage can also have more than six power transistors.

In one embodiment of the invention, the at least four power transistors are disposed in each case as a semiconductor chip directly on a common carrier. At least one of the two electrical supply lines comprises at least one bonding wire. The advantage is that power transistors in the form of the semiconductor chips are particularly inexpensive and enable a particularly good heat dissipation. The current-carrying capacity of the electrical supply line in the region of the at least one bonding wire can be dimensioned in a very simple manner by the suitable choice of the thickness of the respective bonding wire or by the number of bonding wires. Furthermore, by virtue of the common carrier, the high current power output stage is compact and inexpensive in its production.

In a further embodiment of the invention, at least one additional diode is electrically connected in parallel with the at least four power transistors between the supply potential and the reference potential in such a way that it is turned off during normal operation of the high current power output stage and is in the on state when the supply potential and the reference potential are interchanged. This has the advantage that the resulting power loss through the current in the event of polarity reversal is also distributed to the at least one additional diode, such that the requirements made of the current-carrying capacity of the diodes of the at least four power transistors and of the at least one additional diode are reduced further. The power transistors and the at least one additional diode can thus be particularly inexpensive.

BRIEF DESCRIPTION OF THE DRAWINGS

Exemplary embodiments of the invention are explained below with reference to the schematic drawings, in which.

DETAILED DESCRIPTION OF THE PREFERRED EMBODIMENTS

Elements of identical construction or function are provided with the same reference symbols throughout the figures.

Figure 1:
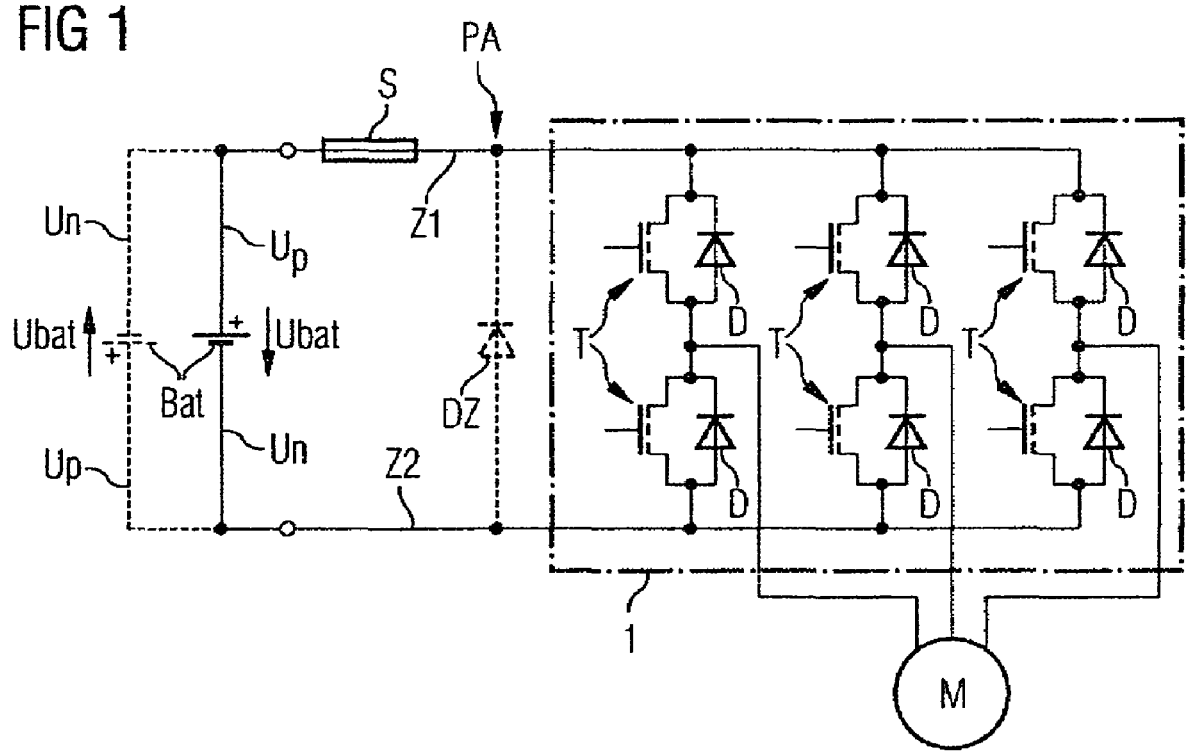
FIG. 1 is a schematic diagram of a circuit arrangement with a high current power output stage according to an embodiment of the invention.

A circuit arrangement comprises a battery Bat, a high current power output stage PA and an electric motor M (FIG. 1). The high current power output stage PA is coupled via a first supply line Z1 to a supply potential Up and via a second supply line Z2 to a reference potential Un of the battery Bat. The battery Bat provides a battery voltage Ubat for operation of the high current power output stage. The high current power output stage PA is electrically coupled to the electric motor M. The electric motor M is operated by means of three-phase current and the high current power output stage PA is designed to generate the three phases of the three-phase current for operation of the electric motor M from the battery voltage Ubat.

The high current power output stage PA comprises, for each of the three phases of the three-phase current, in each case a series circuit formed by two power transistors T each having a diode D. The power transistors T are preferably formed as MOSFET power transistors. The respective series circuit of the power transistors T is coupled to the first supply line Z1 and the second supply line Z2 and therefore connected electrically between the supply potential Up and the reference potential Un. During normal operation of the high current power output stage PA, the diodes D are in each case disposed in the reverse direction, that is to say that the cathode of the diode D is coupled to the supply potential Up, which is positive with respect to the reference potential Un, and the anode of the diode D is coupled to the reference potential Un.

The power transistors T are driven by a control device (not illustrated). The high current power output stage PA can also be formed as a part of the control device.

A fusible link S is provided in the first electrical supply line Z1. The fusible link S is dimensioned in such a way that it is not triggered during normal operation of the high current power output stage PA.

In one embodiment, at least one additional diode DZ (shown in dashed lines in FIG. 1) is provided in parallel with the three series circuits of the power transistors T during normal operation in a manner corresponding to the diodes D, the at least one additional diode is electrically coupled to the supply potential Up by its cathode and to the reference potential Un by its anode.

Since the diodes D of the power transistors T and the additional diode DZ possibly provided are turned off during normal operation, the current flow through the fusible link S and the first and the second electrical supply line Z1, Z2 is dependent on the driving of the power transistors T.

If, however, the supply potential Up and the reference potential Un are interchanged with one another as a result of polarity reversal of the battery Bat, then the diodes D of the power transistors T and the additional diode DZ possibly provided are disposed in the forward direction and therefore in the on state.

Figure 2:
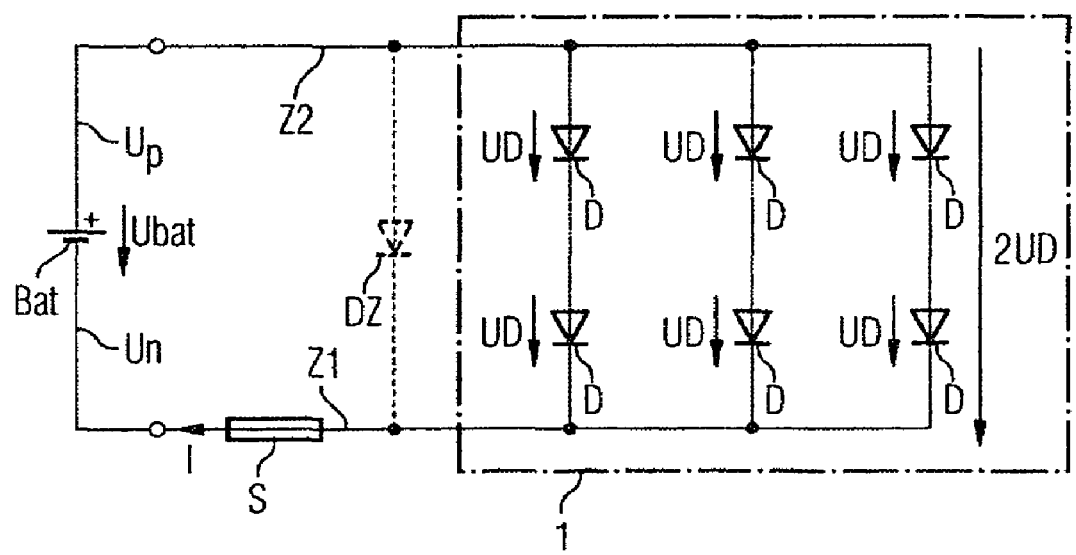
FIG. 2 is a schematic diagram of an equivalent circuit diagram of the circuit arrangement of FIG. 1 in the event of a polarity reversal of a battery.

FIG. 2 shows an equivalent circuit diagram of the circuit arrangement in accordance with FIG. 1 in the event of polarity reversal of the battery Bat. A current I through the fusible link S and through the first and the second electrical supply line Z1, Z2 is then significantly higher than the current in normal operation, e.g., by a factor of between approximately three and ten. The current I is essentially predetermined by the internal resistance of the battery Bat and is dependent on a charge state of the battery Bat. The fusible link S is dimensioned such that it triggers in the event of the current I and thus electrically isolates the high current power output stage PA from the battery Bat. As a result, the high current power output stage PA is protected against damage as a result of the polarity reversal of the battery Bat.

A prerequisite for the protection of the high current power output stage PA in the event of polarity reversal at the battery Bat is that the power loss in the diodes D and the additional diode DZ possibly provided, until the fusible link S is triggered, remains so low that the diodes D and the additional diode DZ possibly provided are not damaged.

Experiments have shown that the protection of an electrical load against polarity reversal by connecting in parallel only one diode corresponding to the additional diode DZ is not possible or is very expensive if, in the event of polarity reversal, the current through said diode amounts to hundreds of amperes and said current has to be carried for approximately ten seconds, for example, without the diode being destroyed, in order to be able to ensure that the fusible link S triggers. The requirements made of the current-carrying capacity of said diode and correspondingly its price, too, are very high as a result.

The requirements made of the current-carrying capacity of each individual power transistor T or the diode D thereof are reduced by distributing the power loss between at least four power transistors T or the diodes D thereof and by suitably dimensioning the first and the second supply lines Z1, Z2. The current I is shared between the three series circuits of the in each case two power transistors T, said series circuits being electrically connected in parallel with one another, and the additional diode DZ possibly provided. Furthermore, the current flow through each of the three series circuits of the power transistors T decreases on account of the doubling of the voltage drop across the series circuits of the power transistors T by comparison with the voltage drop across each individual diode D, which corresponds to a diode voltage UD. As a result, the battery Bat is loaded to a lesser extent, that is to say that the current I is lower if the battery voltage Ubat is limited to double the diode voltage UD than if the battery voltage Ubat is limited to just the diode voltage UD. In accordance with the lower current I, the power loss which each individual diode D has to withstand is also reduced. As a result, the requirements made of the diodes D and correspondingly made of the power transistors T are less stringent, such that inexpensive power transistors T can be chosen.

The additional diode DZ is formed in such a way that double the diode voltage UD is likewise dropped across it. For this purpose, the additional diode DZ is formed for example as a series circuit comprising two individual diodes having the diode voltage UD.

Figure 3:
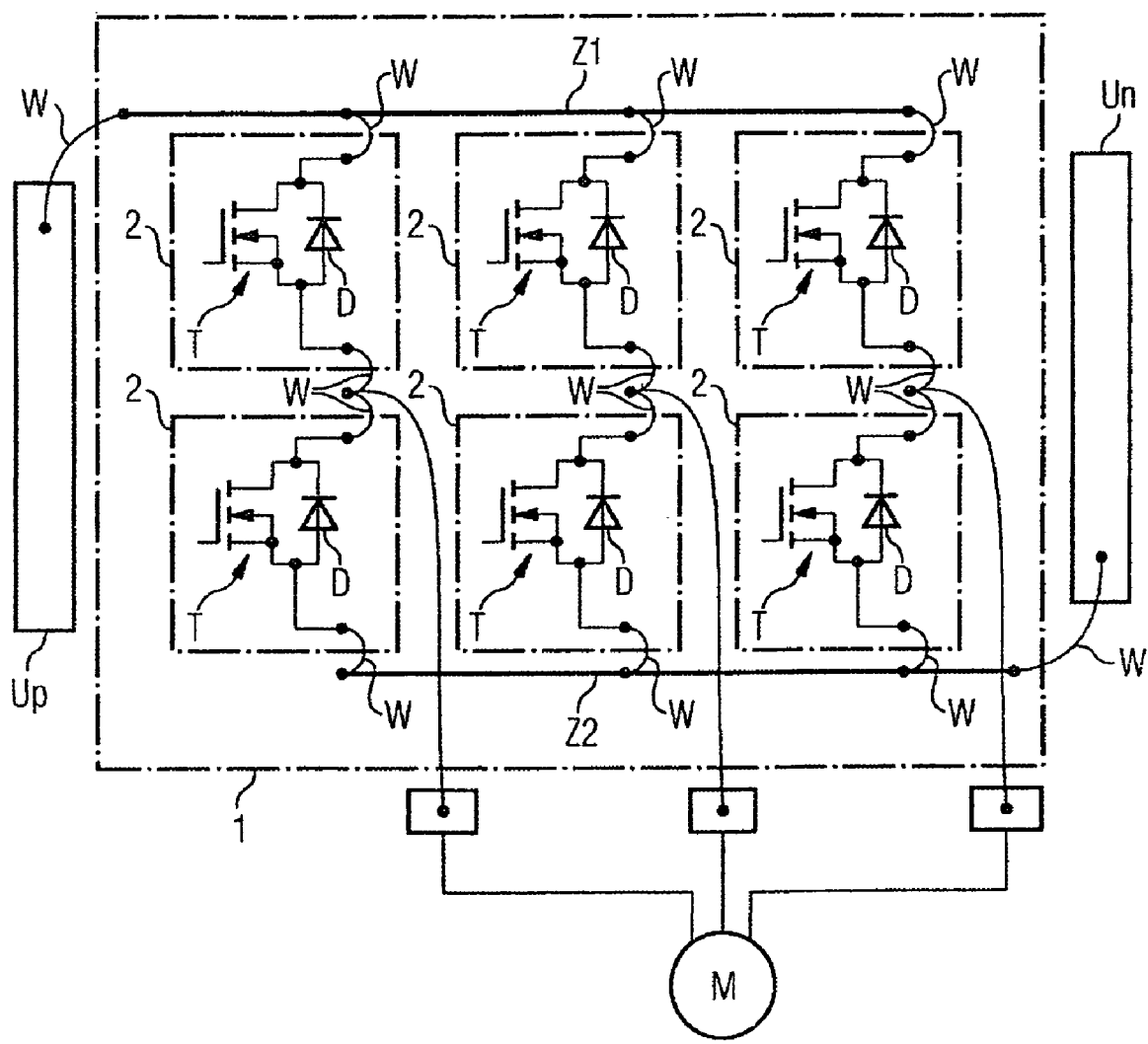
FIG. 3 is a schematic diagram depictions another embodiment of the high current power output stage according to the present invention.

FIG. 3 shows an embodiment of the high current power output stage PA. The six power transistors T in the form of a semiconductor chip 2 in each case are applied on a carrier 1, that is to say that the power transistors T preferably have no housing. The first and the second supply lines Z1, Z2 comprise bonding wires W, via which the respective semiconductor chip 2 is coupled to conductor tracks arranged on the carrier 1. Furthermore, the conductor tracks of the carrier 1 are coupled via bonding wires W to further conductor tracks, which are arranged, e.g., on a printed circuit board. The conductor tracks, the further conductor tracks and the bonding wires W are dimensioned in such a way that they can carry the current I when the supply potential Up and the reference potential Un are interchanged for a carrying time duration that is longer than a triggering time duration of the fusible link S.

The triggering time duration may be a number of seconds since the current flowing during normal operation of the high current power output stage PA, that is to say during operation without polarity reversal, is already very high, e.g., of the order of magnitude of 100 amperes, and the current I which flows in the event of polarity reversal is therefore only a factor of, e.g., approximately three to ten greater than the current during normal operation. However, the fusible link S must be dimensioned in such a way that it reliably does not trigger during normal operation of the high current power output stage PA.

Since the power transistors T are arranged as semiconductor chip 2 without housing on the carrier 1, there is the possibility of dimensioning the current-carrying capacity of the first and the second supply lines Z1, Z2 in the region of the bonding wires W in a very simple manner through the choice of suitable bonding wires W, e.g. with regard to their thickness, or through the choice of a suitable number of bonding wires W disposed in parallel with one another. By way of example, in each case five bonding wires W disposed in parallel with one another are provided in order to be able to carry the current I if three bonding wires W disposed in parallel with one another are already sufficient for normal operation, that is to say operation without polarity reversal. However, more or fewer bonding wires W can also be provided depending on the requirements made of the current-carrying capacity.

What is claimed is:

1. A high current power output stage, comprising:

a common carrier;

at least four power transistors, each of the at least four transistors being disposed on a separate semiconductor chip, each of the at least four transistors having a diode which is turned off during a first operating state of the respective power transistor, and each of the semiconductor chips being arranged on the common carrier;

two electrical supply lines coupling the at least four power transistors to a supply potential and a reference potential, at least one of the two electrical supply lines comprises at least one bonding wire, the at least four transistors being connected in series connected pairs between the two electrical supply lines so that each of said pairs is connected in parallel with the others of said pairs;

at least one fusible link connected in series with said at least four power transistors in at least one of said two electrical power supply lines, said fusible link being configured to trigger in response to a current which flows through the diodes of the at least four transistors when the supply potential and the reference potential are reversed; and at least one additional diode electrically connected in parallel with the series connected pairs of power transistors such that said at least one additional diode is turned off during the first operating state and is in the on state when the supply potential and the reference potential are reversed.

2. A high current power output stage, comprising:

a common carrier;

at least four power transistors, each of the at least four transistors being disposed on a separate semiconductor chip, each of the at least four transistors having a diode which is turned off during a first operating state operation of the respective power transistor, and each of the semiconductor chips being arranged on the common carrier;

two electrical supply lines coupling the at least four power transistors to a supply potential and a reference potential, at least one of the two electrical supply lines comprises at least one bonding wire, the at least four transistors being connected in series connected pairs between the two electrical supply lines so that each of said pairs is connected in parallel with the others of said pairs; and at least one fusible link connected in series with said at least four power transistors in at least one of said two electrical power supply lines, said fusible link being configured to trigger in response to a current which flows though the diodes of the at least four transistors when the supply potential and the reference potential are reversed, wherein the current is in the range of three to ten times greater than the current flowing through the fusible link during the first operating state operation of the at least four power transistors.

\* \* \* \* \*